US007720832B1

(12) United States Patent
da Rosa, Jr.

(10) Patent No.: US 7,720,832 B1
(45) Date of Patent: May 18, 2010

(54) DYNAMIC CONTACT INFORMATION

(75) Inventor: Louis Francisco da Rosa, Jr., Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 390 days.

(21) Appl. No.: 11/789,889

(22) Filed: Apr. 25, 2007

(51) Int. Cl.
*G06F 17/30* (2006.01)

(52) U.S. Cl. .................. 707/705; 707/736; 707/781; 707/782

(58) Field of Classification Search .......... 707/9, 707/10, 101, 102, 104.1, 705, 736, 781, 782
See application file for complete search history.

(56) References Cited

U.S. PATENT DOCUMENTS

| | | | | |
|---|---|---|---|---|
| 6,748,402 B1 * | 6/2004 | Reeves et al. | ............... | 707/201 |
| 6,820,083 B1 * | 11/2004 | Nagy et al. | ..................... | 707/9 |
| 7,010,107 B1 * | 3/2006 | Lee et al. | ............... | 379/202.01 |
| 7,099,862 B2 * | 8/2006 | Fitzpatrick et al. | ............. | 707/3 |
| 7,266,367 B2 * | 9/2007 | Vander Veen et al. | ........ | 455/415 |
| 7,325,012 B2 * | 1/2008 | Nagy | ..................... | 707/104.1 |
| 7,437,320 B2 * | 10/2008 | Davidson et al. | ............. | 705/27 |
| 7,512,612 B1 * | 3/2009 | Akella et al. | ................ | 707/101 |
| 7,539,697 B1 * | 5/2009 | Akella et al. | ................ | 707/102 |
| 7,607,092 B2 * | 10/2009 | Rogers et al. | ............... | 715/734 |

* cited by examiner

Primary Examiner—Jean M Corrielus
(74) Attorney, Agent, or Firm—Osha • Liang LLP

(57) ABSTRACT

A method for presenting contact information that includes receiving a search request for the contact information and retrieving a result set comprising a plurality of contacts corresponding to the search request, wherein each contact comprises a plurality of common contact data fields. The method also includes, for each common contact data field in the result set, determining a differentiating factor for the common contact data field, and selectively displaying at least one value of the common contact data field based on the differentiating factor.

28 Claims, 6 Drawing Sheets

DYNAMIC CONTACT INFORMATION

BACKGROUND

A typical organization website likely includes a page listing the contact information for individuals within the organization. The contacts page normally includes information related to individuals within the organization. For example, such contact information might include the name, phone number, department, and position of each contact. The contact information page usually displays the contact information in a table, with each column representing a field of contact information (e.g., name, telephone number, address, email address, title, and/or other relevant information).

When contact information is presented on a typical contact information page, much of the information is repeated. For example, if there are multiple contacts named John Smith within an organization, a standard tabular representation shows a row for each John Smith. Further, organizations may have contacts that occupy the same role. For example, a company may have multiple individuals with the title of "Software Developer." The overlap of data within contact information fields leads to repetition of contact information. Repetition of the same information from contact data fields places a burden on the user to sift through table rows to find the specific row containing the contact information sought.

SUMMARY

In general, in one aspect, the invention relates to a method for presenting contact information that includes receiving a search request for the contact information and retrieving a result set comprising a plurality of contacts corresponding to the search request, wherein each contact comprises a plurality of common contact data fields. The method also includes, for each common contact data field in the result set, determining a differentiating factor for the common contact data field, and selectively displaying at least one value of the common contact data field based on the differentiating factor.

In general, in one aspect, the invention relates to a system for presenting contact information that includes a first contact data repository and a dynamic contact application in communication with the first contact data repository. The dynamic contact application is configured to receive a search request for the contact information, retrieve a result set comprising a plurality of contacts corresponding to the search request, wherein each contact comprises a plurality of common contact data fields, and for each common contact data field in the result set, determine a differentiating factor for the common contact data field, and selectively display at least one value of the common contact data field based on the differentiating factor.

In general, in one aspect, the invention relates to a data structure for use when displaying contact information in a graphical user interface (GUI) including a first common contact data value, wherein the first common contact data value comprises a first distinct value of a first common contact data field, and a second common contact data value, wherein the second common contact data value comprises a first distinct value of a second common contact data field, wherein the first distinct value of the first common contact data field is displayed in the GUI as the first common contact data value based on a differentiating factor of the first distinct value of the first common contact data field, and wherein the first distinct value of the second common contact data field is displayed in the GUI as the second common contact data value based on a differentiating factor of the first distinct value of the second common contact data field.

In general, in one aspect, the invention relates to a computer readable medium including computer program code embodied therein for displaying contact information, the computer program code including instructions to receive a search request for the contact information, retrieve a result set comprising a plurality of contacts corresponding to the search request, wherein each contact comprises a plurality of common contact data fields, and, for each common contact data field in the result set, determine a differentiating factor for the common contact data field, and selectively display at least one value of the common contact data field based on the differentiating factor.

Other aspects of the invention will be apparent from the following description and the appended claims.

DETAILED DESCRIPTION

Figure 1:
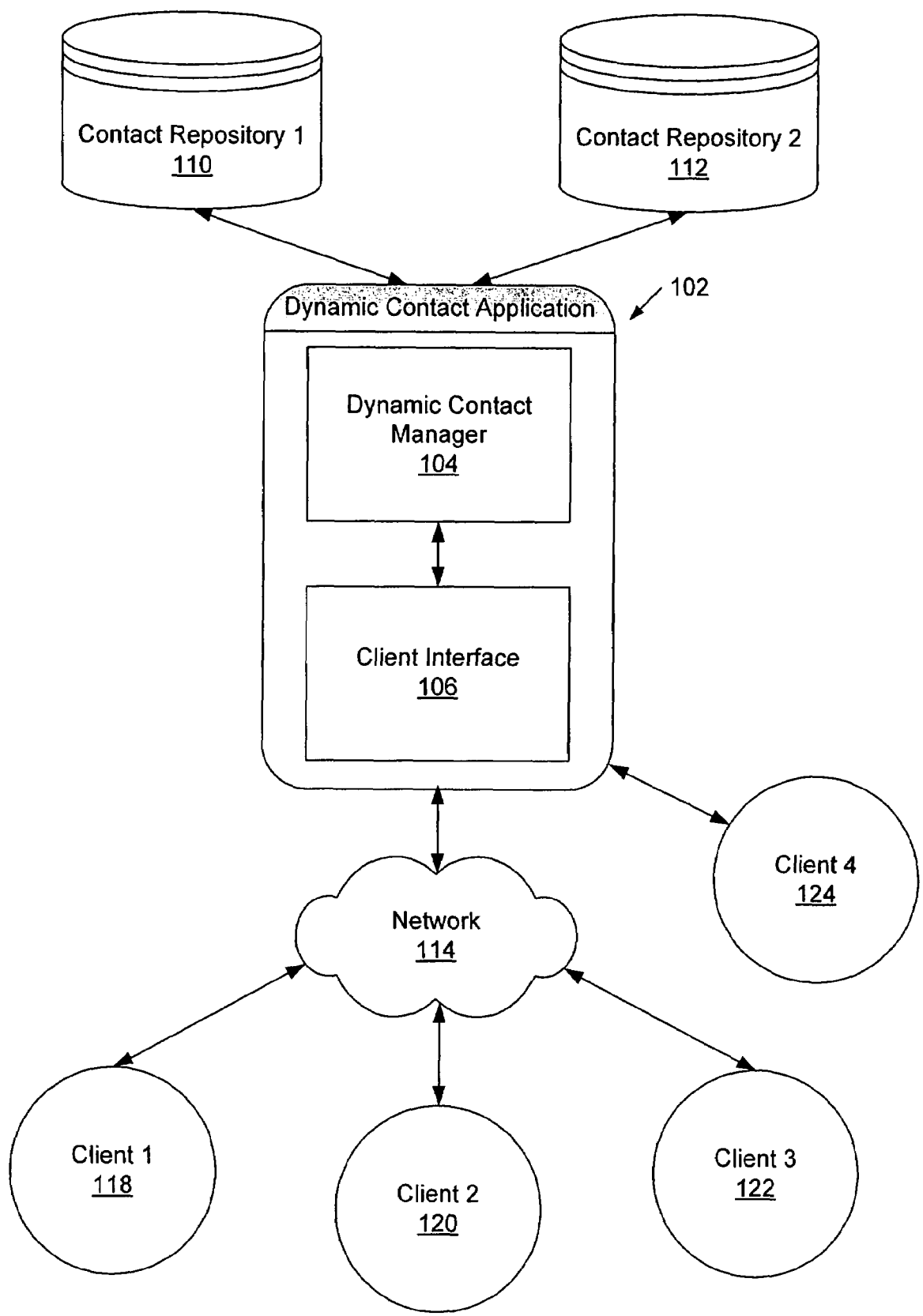
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for presenting contact information. Specifically, embodiments of the invention permit a user to request contact information from a dynamic contact application. Search criteria provided by the user, either directly by specifying the criteria or indirectly through user-selected browsing options, is used to search one or more contact repositories for contact information matching the search criteria. Multiple contact entries that match the search criteria may be located in the search. These multiple contact entries may be referred to as the result set. Each contact entry in the result set may include values for a number of contact data fields.

The result set is then presented to the user in a graphical user interface. Rather than displaying all contact data fields for all contact entries in the result set, the dynamic contact manager displays a minimum amount of information that may uniquely identify a contact entry as the one sought. The information is selected for display based on the uniqueness of the information. More specifically, the information is selected for display based on the likelihood that the information differentiates the contact entries. In some embodiments of the invention, the information is also selected for display based on a prioritization of the contact data fields. Further, in one or more embodiments of the invention, in addition to the differentiating information, one or more of the contact data fields may be displayed for each contact entry regardless of the uniqueness of the information in the contact data fields.

FIG. 1 shows a schematic diagram of a system in accordance with one or more embodiments of the invention. As shown in FIG. 1, the system includes a dynamic contact application (102), one or more contact repositories (e.g., contact repository 1 (110), contact repository (112)), and one or more clients (e.g., client 1 (118), client 2 (120), client 3 (122), client 4 (124)).

A contact data repository (e.g., contact repository 1 (110), contact repository 2 (112)) stores contact information for contacts in an organization. Contacts in an organization may include individuals and/or management entities (e.g., departments, divisions, and subsidiaries). More specifically, a contact entry for a contact in a contact repository (e.g., contact repository 1 (110), contact repository 2 (112)) may include contact data for the contact in the form of values for a number of contact data fields. For example, contact data fields in the contact data for a contact may include a name field, a telephone number field, an address field, a department field, and a position field. Those skilled in the art will appreciate that contact data fields are not limited to the examples described, but may be specially defined according to the needs of an organization. For example, a contact entry in a contact repository for one organization may have a "building" field that would not be applicable for another organization in which all contacts are located in the same building.

A contact data repository (e.g., contact repository 1 (110), contact repository (112)) may be any device or medium capable of storing searchable contact information. For example, a contact data repository (e.g., contact repository 1 (110), contact repository 2 (112)) may be one or more databases, a directory service, one or more flat files, a spreadsheet, an extensible markup language (XML) file, or any other suitable data repository.

In some embodiments of the invention, a contact data repository (e.g., contact repository 1 (110), contact repository 2 (112)) may be hosted on a data server (not shown) maintained by the organization whose contact information is stored in the repository. Further, a contact data repository (e.g., contact repository 1 (110), contact repository 2 (112)) may be directly connected to the dynamic contact application (102) or may be connected to the dynamic contact application (102) via a network (not shown).

The dynamic contact application (102) is configured to retrieve contact information from one or more contact data repositories (e.g., contact repository 1 (110), contact repository 2 (112)) and present the contact information to a client (e.g., client 1 (118), client 2 (120), client 3 (122), client 4 (124)). The dynamic contact application (102) includes a dynamic contact manager (104) and a client interface (106). In one or more embodiments of the invention, the dynamic contact application may be implemented as hosted service (e.g., a web service or any other type of backend service), a stand-alone end-user application, or any other suitable implementation.

The dynamic contact manager (104) is configured to receive requests for contact information from one or more clients via the client interface (106) and to access one or more contact data repositories (e.g., contact repository 1 (110), contact repository 2 (112)) to obtain the requested contact information. A request for contact information includes search criteria to be used to obtain the contact information. The dynamic contact manager (104) is further configured to obtain the requested contact information from the one or more contact data repositories (e.g., contact repository 1 (110), contact repository 2 (112)) using the search criteria. In some embodiments of the invention, the dynamic contact manager (104) includes functionality to create a search request based on the search criteria in accordance with the search interface of a contact data repository (e.g., contact repository 1 (110), contact repository 2 (112)). For example, if the contact repository to be searched is relational database, the dynamic contact manager (106) may construct a Structured Query Language (SQL) query to search the contact repository for any contact entries matching the search criteria.

The dynamic contact manager (104) is also configured to receive a result set of contact entries matching the search criteria from each contact repository (e.g., contact repository 1 (110), contact repository 2 (112)) searched. A result set includes contact data for each contact entry in the form of values for a number of contact data fields. The number and type (e.g., name, address, and telephone number) of the contact data fields in a contact entry depends on the format and/or content of contact entries in the contact repository. In some embodiments of the invention, the dynamic contact manager (104) may translate the contact entries in the result set into an internal result set format for further processing.

In one or more embodiments of the invention, if multiple contact repositories are searched, the result sets received from the contact repositories may be in different formats. Further, the contact data fields of the contact entries included in each result set may differ in number, field type, value type, or any combination thereof. In such embodiments, the dynamic contact manager (104) includes functionality to translate the differing result sets into an internal result set representing an aggregation of the result sets from the contact repositories. For example, a "surname" contact data field in a result set from one contact data repository and a "family name" contact data field in a result set from another contact data repository may be translated to a "last name" common contact data field in the internal result set. Any technique known in the art may be used to translate the contact entries from each result set into contact entries in the internal result set.

The contact entries in the internal result set include common contact data fields specifically defined by the dynamic contact manager (104). In one or more embodiments of the invention, a user may specify the common contact data fields to be included in the internal result set. In some embodiments of the invention, the common contact data fields selected for inclusion in the internal result set may be predetermined based on the types of contact data fields commonly defined in contact data repositories (e.g., first name, last name, telephone number, address, department, and/or position). In such embodiments, if a contact entry in a result set includes a contact data field not defined as a common contact data field in a contact entry in the internal result set, the information from that contact data field is not included in the contact entry in the internal result set.

In other embodiments of the invention, the common contact data fields selected for inclusion in the internal result set may be dynamically determined by the dynamic contact manager (104). More specifically, the dynamic contact manager (104) may identify the contact data fields that are common across all the result sets and create an internal result set with contact entries containing those common contact data fields. If a result set includes a contact data field not found in one or more of the other result sets, then the contact data field may not be included in the internal result set. Alternatively, the contact data field may be included in the internal result set. In the latter case, when a contact entry in the internal result set is created for a contact entry in a result set not including the contact data field, the value of the contact data field is set to indicate that contact information represented by the contact data field is not available for that contact entry.

The dynamic contact manager (104) is further configured to select contact information in the internal result set for presentation to the user and to provide the selected contact information to the client interface (106). More specifically, the dynamic contact manager (104) includes functionality to analyze the internal result set to determine whether any of the common contact data fields contain contact information that may be used to differentiate one or more contact entries from the remaining contact entries. In one or more embodiments of the invention, the dynamic contact manager (104) determines a differentiating factor for each common contact data field in the internal result set. The differentiating factor for a common contact data field is based on the number of distinct values in the common contact data field of the contact entries in the internal result set. For example, a common contact data field in which each value of the field in the contact entries is the same (e.g., the value of an "address" common contact data field is the same for all contact entries) would have a low differentiating factor. Further, a common contact data field in which each value of the field in the contact entries is different (e.g., the value of an "email address" common contact data field is the different for all contact entries) would have a high differentiating factor. Determination of a differentiating factor is shown and discussed below in relation to FIGS. 2-5.

In one or more embodiments of the invention, the dynamic contact manager (104) selects common contact data fields for display based on the relative differentiating factors of the fields. In some embodiments of the invention, the dynamic contact manager (104) may also use priorities of the common contact data fields when selecting common contact data fields for display. The priority of a common contact data field may be a default priority assigned by the dynamic contact manager (104), a priority specified by the user, a priority derived by the dynamic contact manager (104) based on the user's use of the results of prior searches, or any combination thereof. Priorities of common contact data fields are shown and discussed below in relation to FIGS. 2-5.

The dynamic contact manager (104) is further configured to provide the internal result set to the client interface (106) for display in a graphical user interface (GUI) (not shown). The dynamic contact manager (104) also provides information to the client interface (106) as to which common contact data fields in the internal result set are to be displayed. The client interface (106) includes functionality to format the contact entries in the internal result set for presentation in the GUI. The client interface (106) may format the contact entries for presentation in a tabular format, a tree format, a hierarchical format, or any other suitable display format.

In one or more embodiments, the contact information formatted for presentation for each contact entry only includes the values of those common contact data fields selected by the dynamic contact manager (104). In some embodiments of the invention, the client interface (106) may also include the values of one or more common contact data fields not specifically selected by the dynamic contact manager (106). More specifically, one or more of the common contact data fields may be designated as basic common contact data fields (i.e., a contact data field that is included when contact information is displayed for the user whether the common contact data field contains differentiating information). For example, the "last name" and "first name" fields of each contact entry may be designated for inclusion in the display of contact information. The designation of the basic common contact data field or fields for inclusion in the display may be based on a predetermined default designation, may be made by a user, may be derived based on based on the user's interaction with the display of prior search results, or any combination thereof.

The client interface (106) is also configured to receive contact information search requests from a user and provide the search requests to the dynamic contact manager (104). In one or more embodiments of the invention, the client interface (106) may include functionality to present a search dialog to a user that the user may use to specify the search criteria for locating contact information. Further, in some embodiments of the invention, the client interface (106) may include functionality to present an dialog to allow a user to browse contact information and select browsing actions that result in the generation of search requests including search criteria appropriate to the browsing action. Search requests are described in more detail below in relation to FIG. 2. The client interface (106) may also be configured to receive a selection and/or prioritization of common contact data fields from a user and provide the selection/prioritization information to the dynamic contact manager (104).

In one or more embodiments of the invention, the client interface (106) is configured to provide the formatted contact information to a GUI for display to a user. The GUI may be a web page in a web browser, a window in a stand-alone end-user application, or any other type of interactive computer display. The client interface (106) includes functionality to provide the formatted contact information to the GUI in a form usable by the GUI. For example, if the GUI is a web page in a web browser, the client interface (106) may provide the information a form usable by the web browser. Specifically, the client interface (106) may encode the formatted contact information using, for example, Hypertext Markup Language (HTML), Extensible Markup Language (XML), JavaScript, or a combination thereof.

In one or more embodiments of the invention, the GUI executes on a client system (e.g., client 1 (118), client 2 (120), client 3 (122), client 4 (124)) connected to the dynamic contact application (102). A client system (e.g., client 4 (124)) may be directly connected to the dynamic contact application (102) or may be connected to the dynamic contact application (102) via a network (114) (e.g., client 1 (118), client 2 (120), client 3 (122)). The network (114) may be a wide area network (WAN), a metropolitan area network (MAN), a local area network (LAN), a public network (such as the Internet or World Wide Web), or any combination thereof. Further, the network (114) may include one or more networks interconnected by other network types (e.g., distinct LANs connected by one or more WANs).

A client system (e.g., client 1 (118), client 2 (120), client 3 (122), client 4 (124)) may be a computer system such as desktop computer, a laptop computer, a mobile device (e.g., a cellular telephone, personal digital assistant (PDA), or any other type of mobile device), or any other computing device suitable for hosting the GUI. In some embodiments of the invention, the GUI is provided via a web browser (not shown) installed on a client system (e.g., client 1 (118), client 2 (120), client 3 (122), client 4 (124)).

One of ordinary skill in the art will appreciate that embodiments of the invention are not limited to the configuration shown in FIG. 1. In one or more embodiments of the invention, the dynamic contact application (102) may be hosted by an organization allowing user access to a contact data repository maintained by the organization or may be hosted by a third party. Further, in some embodiments of the invention, some components of the dynamic contact application (102) may be installed on a client system (e.g., client 1 (118), client 2 (120), client 3 (122), client 4 (124)) while other components are hosted by an organization or third party. For example, the dynamic contact manager (104) may be hosted by an organization or a third party and the client interface (106) may be installed on a client system (e.g., client 1 (118), client 2 (120), client 3 (122), client 4 (124)). Furthermore, in some embodiments of the invention, a client system (e.g., client 1 (118), client 2 (120), client 3 (122), client 4 (124)) may include a client data repository (e.g., contact repository 1 (110), contact repository 2 (112)). Alternatively, all components of the system (e.g., the dynamic contact application (102) and one or more client data repositories (e.g., contact repository 1 (110), contact repository 2 (112)) may be installed on a client system (e.g., client 1 (118), client 2 (120), client 3 (122), client 4 (124).

While the system shown in FIG. 1 is directed the organization of and presentation of contact information, one skilled in the art will appreciate that the invention may equally apply to organization and presentation of various information types. For example, the presentation of results from a database query, an internet search, or other data-intensive inquiry may use the system of the present invention, as described in FIG. 1, to display data in an optimal format for the user. Likewise, the methods described below in FIGS. 2-5 should also be viewed in light of any manner to organize and present various types of information. For example, any manner of presenting results from any sort of database query, an internet search, or other data-intensive inquiry should be contemplated and the methods described should not be limited to merely contact information FIGS. 2-5 show flowcharts of methods for presenting information, in accordance with one or more embodiments of the invention. While the various steps in these flowcharts are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 2-5 should not be construed as limiting the scope of the invention.

Figure 2:
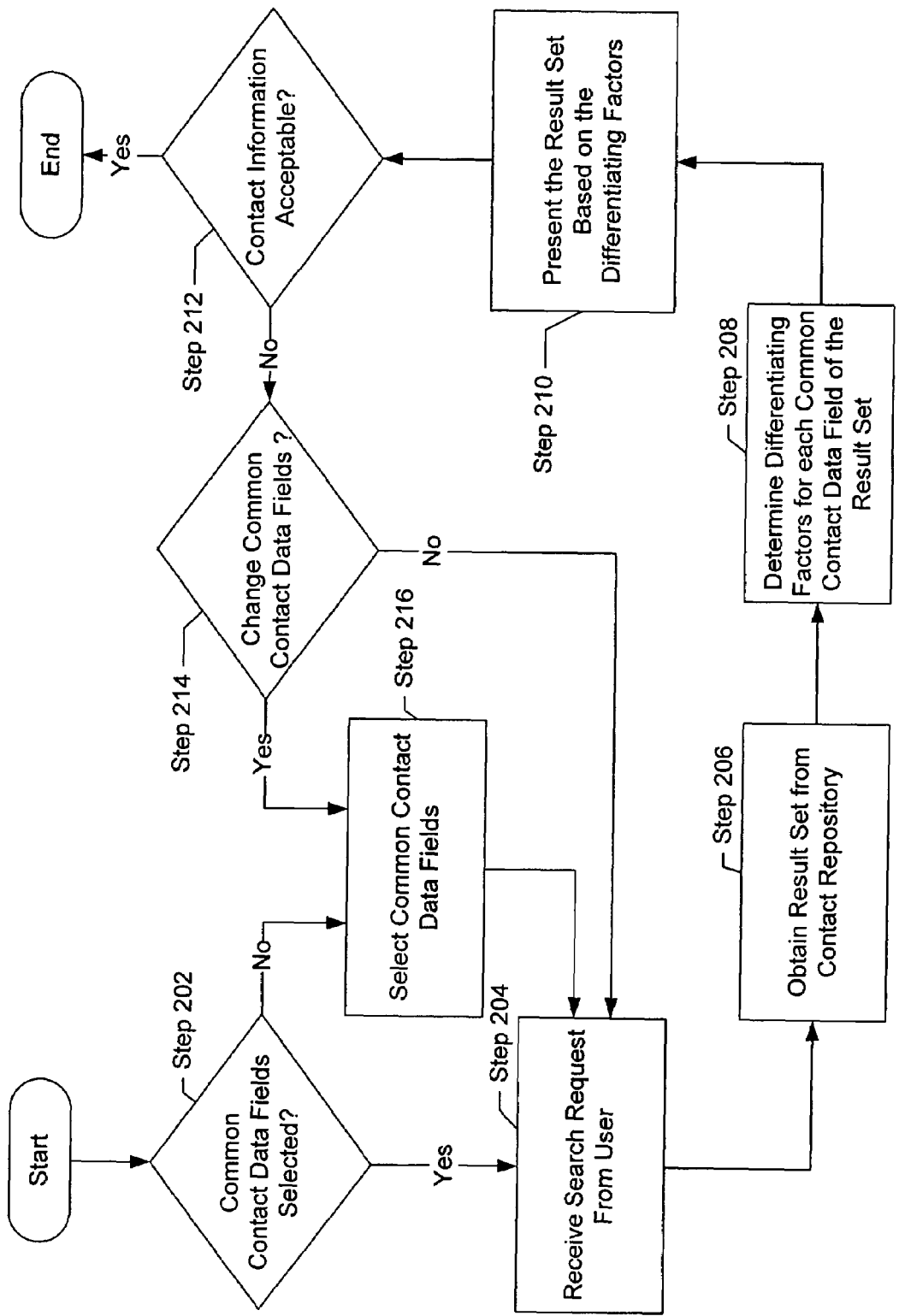
FIGS. 2 and 4-5 show flowcharts for presenting information in accordance with one or more embodiments of the invention.

FIG. 2 shows a flowchart depicting a method for presenting information to a user. Prior to initiating a search for contact information, common contact data fields may be selected for inclusion in the internal result set used by a dynamic contact application. The common contact data fields included in the internal result set define the contact information that may be displayed to the user as the result of a search for a contact. Further, one or more of the common contact data fields may be selected as basic common contact data fields (i.e., common contact data fields that are included when contact information resulting from a search is displayed for the user whether or not the common contact data fields contain differentiating information).

Initially, a determination is made as to whether common contact data fields need to be selected (Step 202). In one or more embodiments of the invention, the dynamic contact application may include default selections for the common contact data fields included in the internal result set and/or for the basic common contact data fields. Further, the dynamic contact application may monitor a user's interaction with the results of previous searches and refine the default selections based on these interactions. In such embodiments, the determination as to whether common contact data fields should be selected may be based on whether the selection of common contact data fields needs to be modified.

In some embodiments of the invention, the dynamic contact application may not include default selections for the common contact data fields. In such embodiments, the determination as to whether common contact data fields should be selected may be based on whether the user has previously selected the common contact data fields. Further, in one or more embodiments of the invention, the user may determine that common contact data fields should be selected.

If a determination is made that common contact data fields should be selected (Step 202), the common contact data fields are selected (Step 216). In one or more embodiments of the invention, the user may be prompted to select the common contact data fields for inclusion in the internal result set. For example, the user may be presented with a list of candidate common contact data fields from which to make selections. In some embodiments of the invention, the user may also assign a priority to the selected common contact data fields. The assigned priorities may be used to determine the order in which values of the common contact data fields are displayed in the results of a search. The assigned priorities may also be used by the dynamic contact application when determining if the values of a common contact are to be displayed. Further, in some embodiments of the invention, the user may optionally select one or more of the common contact data fields as basic common contact data fields.

In one or more embodiments of the invention, the dynamic contact application may select the common contact data fields and/or the basic common contact data fields based on the user's prior interactions with search results. The dynamic contact application may also assign or modify the priorities of the common contact data fields based on the user's prior interactions. A method for selecting common contact data fields is described in more detail below in relation to FIG. 3.

If there is no need to select common contact data fields or after the common contact data fields are selected, a search request is received from the user (Step 204). The search request includes search criteria to be used in searching for contact information. In one or more embodiments of the invention, the search request may be directed to locating specific contact information. In such embodiments, the search criteria may be in the form of values of one or more of the selected common contact data fields. For example, a search request may request all contacts having a value of "Smith" in a "last name" common contact data field. In some embodiments of the invention, the user may use a dialog in a GUI that allows the user to specify the search criteria.

In some embodiments of the invention, the search request may result from a user browsing contact information available through the dynamic contact application. For example, the user may use a dialog in a GUI to browse contact information by alphabetic selection. That is, the user may be presented with a browse dialog including a number of buttons, each labeled with a letter of the alphabet. In such a dialog, when a user selects one of the buttons, the user is requesting to see all contact entries having a value in a common contact field that starts with the letter on the button. For example, the user may select a button labeled "S" to request to see all contact entries having a last name starting with the letter "S." The selection of the button causes the generation of a search request containing the appropriate search criteria.

After receiving the search request, the dynamic contact application obtains a result set from a contact repository using the specified search criteria (not shown). In some embodiments of the invention, the contact data fields in the result set may be identical to the selected common contact data fields. Alternatively, the contact data fields of the contact entries in the result set may be translated into common contact data fields of contact entries in an internal result set. In one or more embodiments of the invention, the dynamic contact application may obtain results sets from multiple contact repositories. In such embodiments, the multiple result sets may be translated in a single internal result set.

The dynamic contact application may then determine what contact information in the internal result set is to be presented to the user. To make this determination, a differentiating factor is determined for each common contact data field in the internal result set (Step 208). A differentiating factor represents the relative uniqueness of distinct values in a common contact field of each contact entry in the internal result set. That is, a differentiating factor represents the likelihood that the distinct values of a common contact data field in the contact entries may be used to distinguish one contact entry from another contact entry.

A distinct value of a common contact data field is a value of the common contact data field that appears in one or more contact entries that differs from other values of the common contact data field that appears in other contact entries. For example, if six contact entries in a result set have values of ["Smith", "Smith", "Smith", "Jones", "Jones", "Brown"] in a "last name" common contact data field, the distinct values of the "last name common contact data field are ["Smith", "Jones", "Brown"].

The differentiating factors for the common contact data fields may be determined using any suitable technique. In one or more embodiments of the invention, a differentiating factor for a common contact data field may be determined based on the relative number of occurrences of distinct values in the common contact data field of the contact entries in the result set. More specifically, the differentiating factor for a common contact data field may be a function of differentiating factors determined for each distinct value of the common contact data field.

The differentiating factors of the distinct values of a common contact data field may be determined using any suitable technique. In one or more embodiments of the invention, a differentiating factor for a distinct value may be calculated as the ratio of the number of times the distinct value occurs in the common contact data field of the contact entries over the total number of contact entries. Continuing with the example above, "Smith" has a 0.5 differentiating factor, since "Smith" is the value of the "last name" common contact data field in three of the six contact entries. In this example, "Jones" has a differentiating factor of 0.33 and "Brown" has a differentiating factor of 0.166.

Using this scheme for determining differentiating factors, the larger the differentiating factor of a distinct value, the lower the likelihood that the distinct value may distinguish (i.e., differentiate) one or more contact entries containing the distinct value from other contact entries. For example, if each contact entry contains the same value for a common contact data field, that value does not differentiate the contact entries. The differentiating factor for that value would be 1.0, the highest possible differentiating factor. Conversely, the smaller the differentiating factor of a distinct value, the higher the likelihood that the distinct value may differentiate the one or more contact entries containing the distinct value.

In one or more embodiments of the invention, differentiating factors for each distinct value may also be adjusted based on a weighting of the distinct values. For example, when distinct values of common contact data field are initially identified, a default weight may be assigned to each distinct value. The default weights may be adjusted up or down based on preferences shown by the user. The weight of a distinct value may be used to lower a high differentiating factor or to increase a low differentiating factor.

For example, the user may have previously performed a number of searches for contact information using search criteria that specified that the value of a "job title" common contact data field should be "manager." Thus, the user has shown a preference for a distinct value, i.e., "manager," of the "job title" common contact data field. When the user subsequently performs a search for contact information that does not specify the job title, a distinct value of "manager" in the "job title" common contact data field is assigned a higher weight than other distinct values in the "job title" common contact data field because the user has demonstrated a preference for the job title.

As previously stated, the differentiating factor for a common contact data field may be a function of the differentiating factors of the distinct values of the common contact field in the contact entries. For example, the differentiating factor of a common contact data field may be the average of the differentiating factors of the distinct values, the median value of the differentiating factors of the distinct values, or any other suitable value determined from the differentiating factors of the distinct value. Further, the differentiating factor for a common contact data field may be a Boolean value that indicates whether the values in the common contact data field may sufficiently differentiate contact entries. This Boolean value may be set based on a threshold value of the differentiating factors of the distinct values. That is, if any differentiating factor of a distinct value of the common contact data field exceeds the threshold, the Boolean value is set to indicate that the values in the common contact data field do not sufficiently differentiate the contact entries. Otherwise, the Boolean value is set to indicate that the values in the common contact data filed may sufficiently differentiate the contact entries.

Once the differentiating factors are determined, the contact entries in the result set are presented to the user based on the differentiating factors (Step 210). The dynamic contact application may select the common contact data fields to be displayed for contact entries in the result set based on the differentiating factors of the common contact data fields. In one or more embodiments of the invention, the values of common contact data fields with a differentiating factor that exceeds a threshold value are not included in the contact information displayed for a contact entry. In addition, in one or more embodiments of the invention, the values of common contact data fields may be presented in an order determined by the differentiating values of the each distinct value. Further, in one or more embodiments of the invention, the values of those common contact data fields designated as base common contact data fields are displayed for the contact entries whether the differentiating factors of those common contact data fields exceed the threshold value.

In one or more embodiments of the invention, the priorities of the common contact data fields may also be used to determine which of the contact data fields is to be displayed. For example, a common contact data field with a high priority and a high differentiating factor may be selected for display over another common contact data field with a lower differentiating factor and a lower priority. Further, in one or more embodiments of the invention, the order in which the values of the common contact data fields are displayed may be based on the differentiating factors of the common contact data fields, the priorities of the common contact data fields, the designation of a common contact data field as a base common contact data field, or a combination thereof.

When the contact information in the result set is presented, the user may determine whether the contact information is acceptable (Step 212), i.e., that the desired contact is included in the result set. If the user indicates that the contact information is not acceptable, the user may request another search. Prior to receiving the new search request, a determination may be made as to whether the selection of common contact data fields needs to be changed (Step 214).

As previously discussed, in one or more embodiments of the invention, the dynamic contact application may monitor a user's interaction with the results of previous searches and refine the selections of common contact data fields based on these interactions. In such embodiments, the determination as to whether the selection of common contact data fields need to be changed may be based on whether the user's interactions have indicated a need to change the selection. Further, in one or more embodiments of the invention, the user may determine that common contact data fields should be selected. For example, the user may be asked whether the user wants to change the selection of common contact fields.

If a determination is made that the selection of common contact data fields is to be changed, the common contact data fields are selected (Step 216) as previously described. If a determination is made that the selection of common contact data fields is not to be changed or after the selection of the common contact data field is completed, a new search request is received from the user (Step 204) and is processed as previously described.

Figure 3:
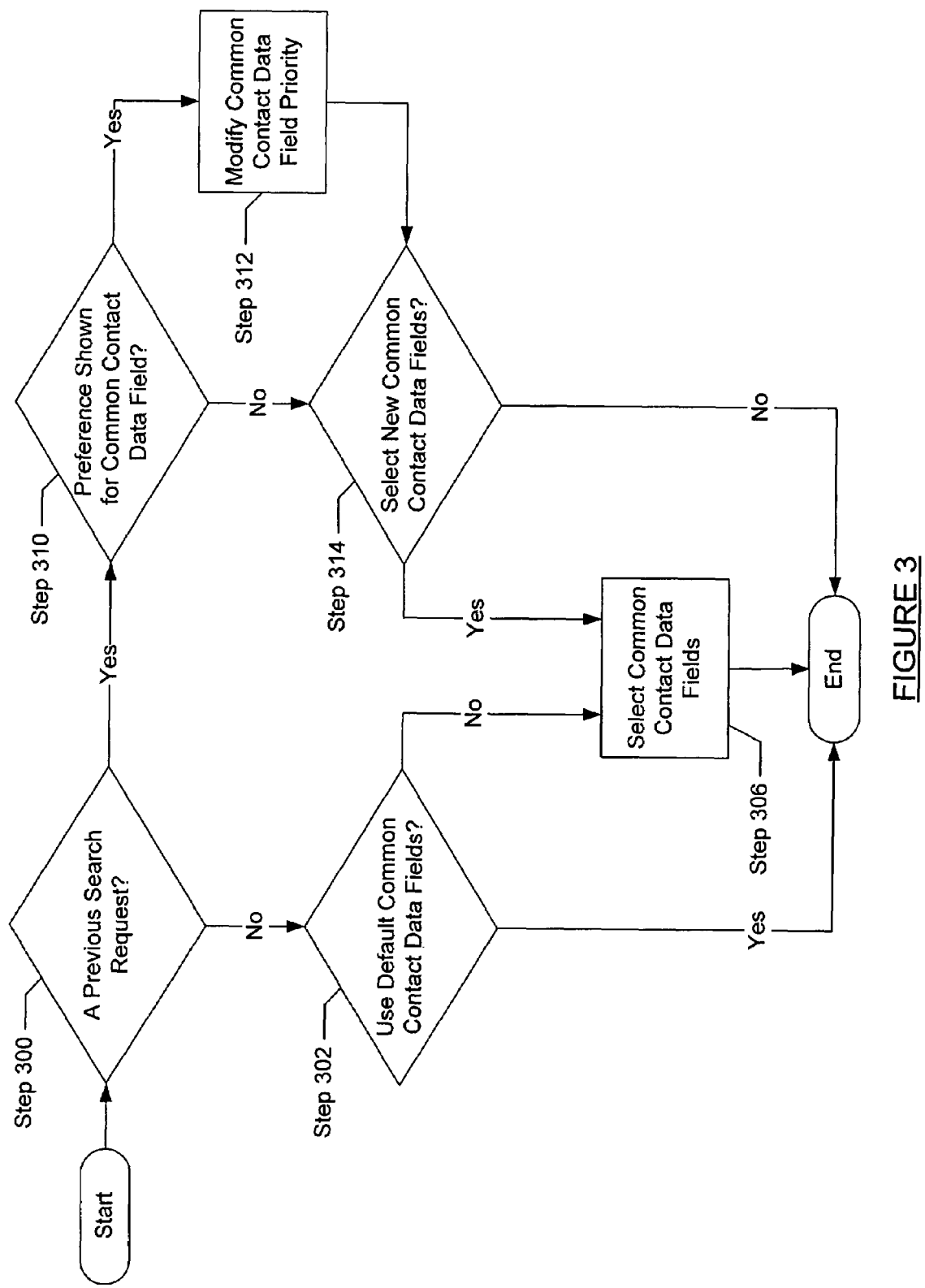
FIG. 3 shows a flowchart for selecting common contact data fields in accordance with one or more embodiments of the invention.

FIG. 3 shows a flowchart of a method for selecting common contact data fields in accordance with one or more embodiments of the invention. Initially, a determination is made as to whether one or more previous searches have been conducted by a user (Step 300). In one or more embodiments of the invention, the manner in which the conduct of prior searches is determined may depend on the nature of the client interface of the dynamic contact application. For example, if the client interface is part of a web site, then the presence or absence of a cookie in a Hypertext Transfer Protocol (HTTP) request may used to indicate whether prior searches have been conducted. Alternatively, if the client interface is installed on a client computer system, a Boolean variable may be set to indicate that prior searches have been conducted.

If one or more prior searches have not been conducted, a determination is made on whether to use the default common contact data fields specified by the dynamic contact application (Step 302). In one or more embodiments of the invention, the user may make the determination of whether to use the default common contact data fields. For example, the dynamic contact application may ask the user whether the user wants to use the default common contact data fields or select the common contact data fields. If a determination is made to use the default common contact data fields, the selection process ends.

If a determination is made not to use the default common contact data fields, then the common contact data fields are selected (Step 306). In one or more embodiments of the invention, the user may be presented with a dialog to select the desired common contact data fields. In some embodiments of the invention, the dialog is not presented unless the user actively decides (e.g., by clicking a button on a HTML document) to select common contact data fields. In some embodiments of the invention, the dialog may be one or more HTML forms in which the common contact data fields may be selected using radio buttons, checkboxes, or another suitable interface to indicate which fields are selected. Once the common contact data fields are selected, the selection process ends.

If one or more prior searches have been conducted (Step 300), a determination is made as to whether the user has shown a preference for a common contact data field (310). As previously discussed, the dynamic contact application may monitor user interactions with search results to determine user preferences. In one or more embodiments of the inventions, a preference for a common contact data field may be indicated when the user clicks on a value of the common contact data field, highlights a value in the common contact data field, moves a mouse pointer over a common contact data field, or by some other action in relation to the common contact data field.

In one or more embodiments of the invention, how a preference for a common contact data field is communicated may depend on the nature of the client interface of the dynamic contact application. For example, if the client interface is part of a web site, then the presence of a token in a cookie contained in an HTTP request may be used to indicate that a preference was shown. Alternatively, if the client interface is installed on a client system, event handlers in the GUI may be used to monitor user activity in the GUI for preferences.

If the user has indicated a preference for a common contact data field (Step 310), the priority of the common contact data field may be modified (Step 312). That is, the priority of the common contact data field may be raised relative to the priorities of other common contact data fields. The priorities of the other common contact data fields may also be changed by changing the priority of the preferred common contact data field.

If the user has not indicated a preference for a common contact data field (Step 310) or modification of the priority of a preferred common contact data field is complete, a determination is made as to whether new common contact data fields should be selected (Step 314). In one or more embodiments of the invention, a dialog may be presented to the user to determine whether the user wishes to select new common contact data fields. In some embodiments of the invention, the dynamic contact application may determine that new common contact data fields need to be selected based on the user's prior interactions with search results.

If a determination is made not to select new common contact data fields, the selection process terminates. Otherwise, common contact data fields are selected (Step 306). In some embodiments of the invention, the dynamic contact application may select new common contact data fields based on the user's prior interactions with search results. In one or more embodiments of the invention, the user may select the new common contact data fields, as previously described. After the common contact data fields are selected, the selection process terminates.

Figure 4:
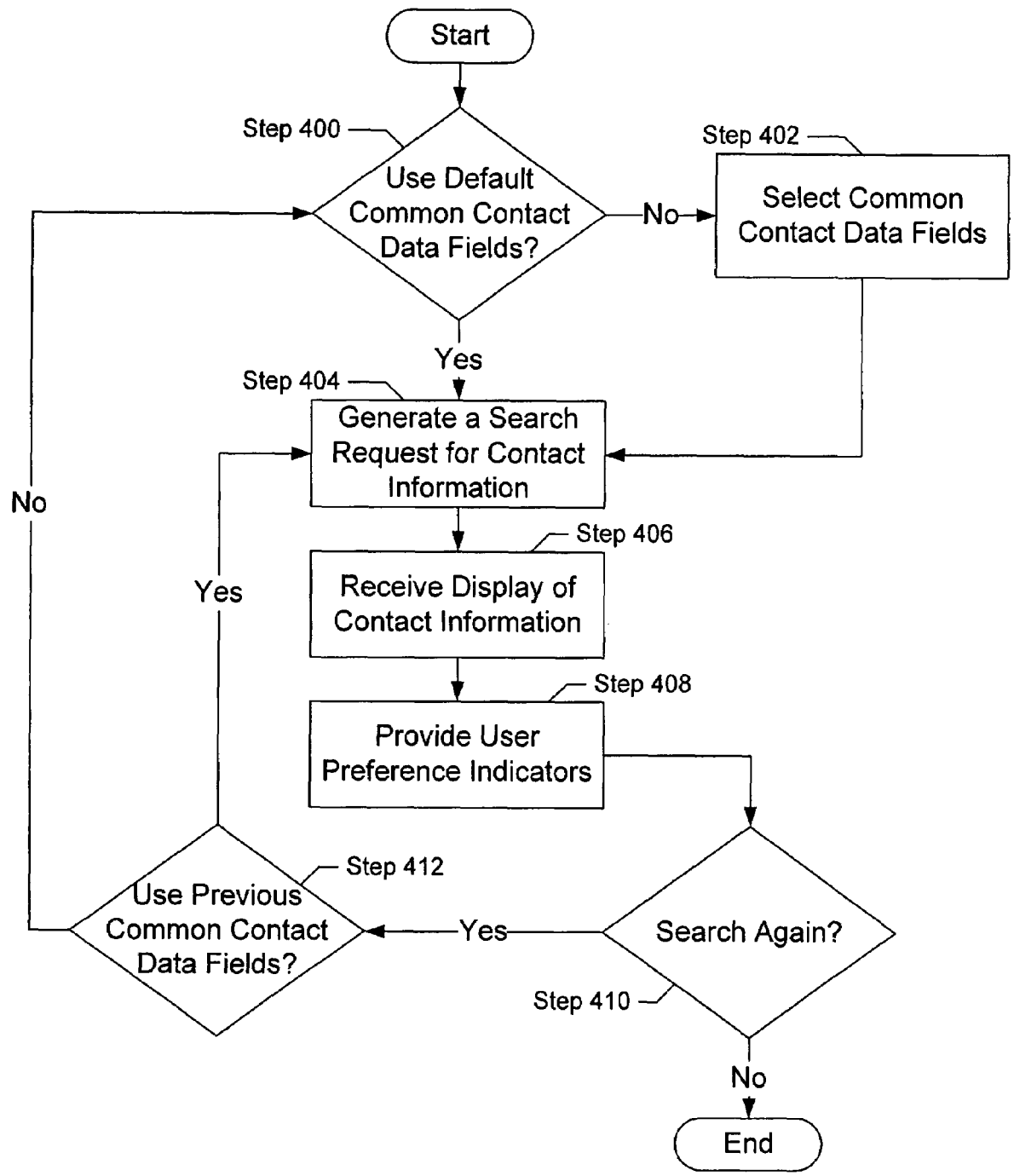

FIG. 4 shows a flowchart of a method for presenting dynamic contact information in accordance with one or more embodiments of the invention. Specifically, FIG. 4 depicts a method of presenting contact information from the perspective of a user. Initially, the user may make a determination as to whether to use the default common contact data fields specified by the dynamic contact manager.

In one or more embodiments of the invention, the default common contact data fields may be displayed to the user to assist the user in making the determination. If the user decides not to use the default common contact data fields, the user may select to use the common contact data fields (Step 402). For example, the user may select the common contact data fields as previously described above in relation to FIGS. 2 and 3. In one or more embodiments of the invention, the user may also assign priorities to the selected common contact data fields and/or designate one or more of the common contact data fields as basic common contact data fields.

After the common contact fields are determined, the user may generate a search request for contact information (Step 404). In one or more embodiments of the invention, the user may use a dialog in a GUI of a client system to select the search criteria for the search request. The dialog may include an interface showing each of the common contact data fields and allowing the user to enter values for those common contact data fields. The values entered by the user are the search criteria for the search request.

In some embodiments of the invention, the user may use a dialog in a GUI of a client system to browse contact information and select a browsing action that causes the generation of a search request with search criteria appropriate to the selected browsing action. For example, as previously explained in relation to FIG. 2, the user may use a dialog in a GUI to browse contact information by alphabetic selection. In this dialog, user selection of an alphabetically labeled button causes the generation of a search request for contact entries having a common contact field with a value starting with the letter displayed on the button.

Once the search request is generated, the request is sent to the dynamic contact application for processing. The processing of a search request is to obtain a result set of contact information based on the search request is shown and described above in relation to FIG. 2.

The user then receives a display of the contact information located by the dynamic contact manager (Step 406). More specifically, the contact information is displayed in the GUI of a client system for viewing by the user. As previously described, the contact information displayed to the user is selected based on the differentiating factors of the common contact data fields. In some embodiments of the invention, priorities of the common contact data fields may also be used in the selection of contact information displayed to the user.

As the user is viewing the presentation of the contact information, one or more user preference indicators may be provided to the dynamic contact application as the user interacts with the displays. In one or more embodiments of the inventions, a preference indicator may be provided to the dynamic contact data manager when the user clicks on a value of the common contact data field, highlights a value in the common contact data field, moves a mouse pointer over a common contact data field, or takes some other action in relation to the common contact data field. In one or more embodiments of the invention, the dynamic contact application may monitor the interactions of the user with displays of contact information to determine user preferences for common contact data fields and/or distinct values of common contact data fields. The preference indicators may be used the dynamic contact application to determine user preferences.

After viewing the display, the user may determine whether another search should be conducted (Step 410). If the user wishes to conduct another search, the user may make a determination as to whether to use the common contact data fields of the previous request (Step 412). If the user decides to use the previous common contact data fields, the user may then generate a new search request (Step 404). If the user decides not to use the previous common contact fields, the user may repeat the previously describe process for determining which common contact data fields to use (Steps 400 and 402) before generating the new search request (Step 404).

Figure 5:
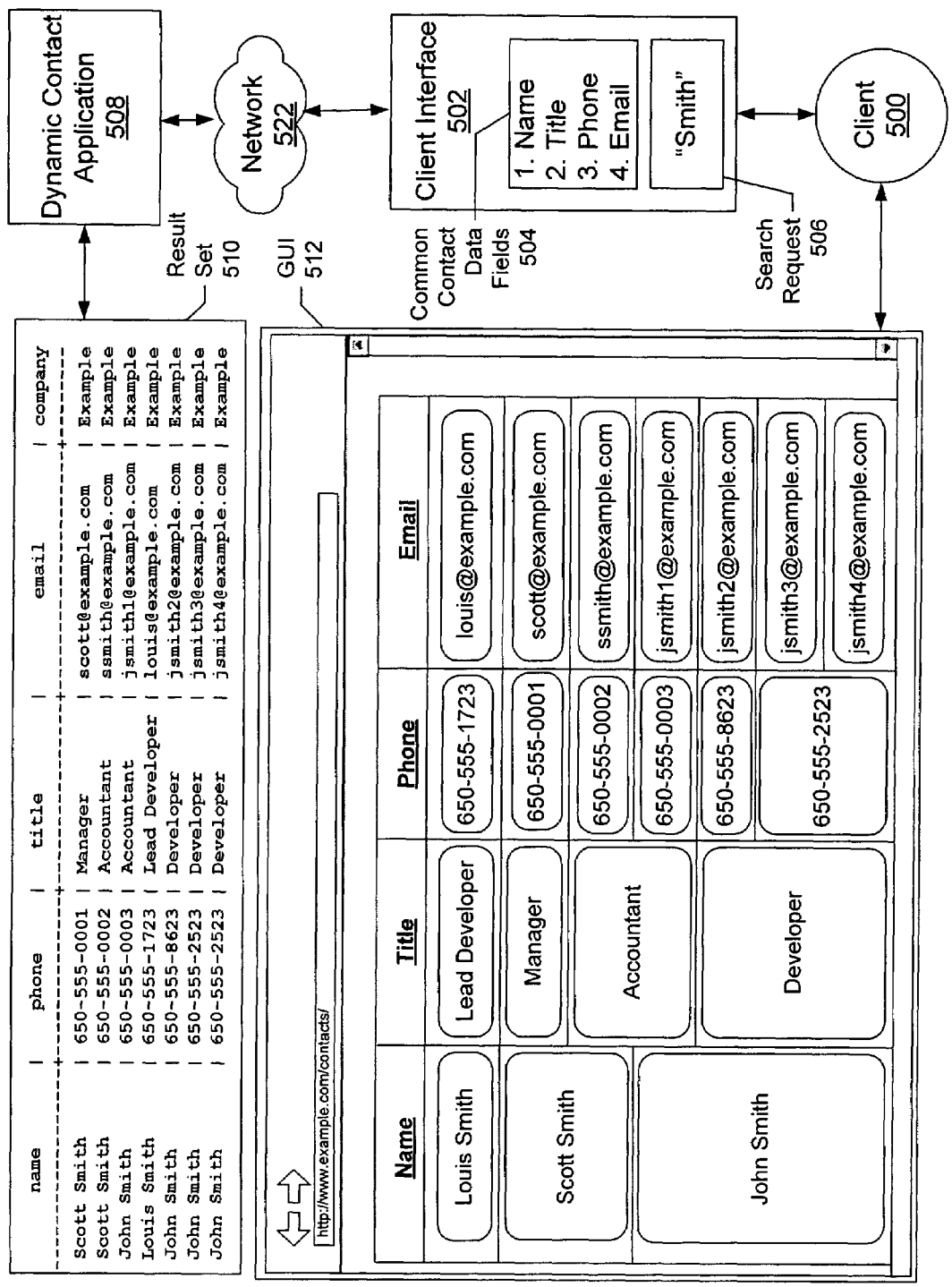

FIG. 5 shows an example of presenting contact information in accordance with one or more embodiments of the invention. In the example, a user of a client system (500) is seeking contact information. Using a GUI (512) on the client system (500), the user selects the common contact data fields (504) (i.e., Name, Title, Phone, Email) to be included in the result set of a search for contact information. The user also assigns a priority to each of the common contact data fields (504) (as indicated by the number beside each specified common contact data field). The client interface (502) interacts with the GUI (512) on the client system to receive the selection and prioritization of the common contact data fields (504) from the user.

The user may also generates a search request (506) using the GUI (512). In one or more embodiments, the client interface (502) interacts with the GUI (512) to present a dialog (not shown) to the user for generating the search request. In the example, the user is requesting contact information for contacts where the value of a "name" common contact data fields includes "Smith."

The client interface (502) provides the common contact data fields (504) and the search request (506) to the dynamic contact application (508) over a network (522). The dynamic contact application (508) queries a contact data repository (not shown) using the search criteria in the search request to retrieve a result set (510) including all contact entries in the contact data repository that match the search criteria. The dynamic contact application (508) then uses the result set (510) to create an internal result set (not shown) of contact entries that include values for the common contact data fields specified by the user. That is, each contact entry in the result set (510) is translated into a contact entry in the internal result set. During the translation process, the values of the contact data fields (i.e., name, phone, title, email, company) in the result set (510) are translated into values of the common contact data fields (i.e., Name, Title, Phone, Email). Note that the values of the "company" contact data field are not included in the internal result set as the user has not selected a common contact data that contains information about the company of a contact.

The dynamic contact application (508) then determines differentiating factors for each common contact data field of the internal result set based on the distinct values in the common contact data field. The dynamic contact application (508) then provides the differentiating factors and the internal result set to the client interface (502). Using the internal result set, the differentiating factors, and the priorities of the common contact data fields, the client interface (502) generates one or more web pages for presenting the contact information to the user in the GUI (512).

The user accesses the web pages via the GUI (512) to view the result of the search request. In the example, the display in the GUI (512) shows the common contact data fields from left to right in order of the user-specified priorities of the common contact data fields. Further, each distinct value of a common contact data field (i.e., Name, Title, Phone, Email) is shown according to the value of a differentiating factor determined for the distinct value. Because "John Smith" is the value of the Name common contact data field of four of the seven contact entries in the internal result set, the differentiating factor for the distinct value of "John Smith" is high relative to the other distinct values in the Name common contact data field. Therefore, the contact entries having "John Smith" as the value of the "Name" common contact data field are relegated to the bottom of the display. Because "Louis Smith" is the value of the Name common contact data field in only one of the seven contact entries in the internal result set, the differentiating factor for the distinct value of "Louis Smith" is low relative to the other distinct values in the Name common contact data fields. Therefore, the contact entry having "Louis Smith" as the value of the "Name" common contact data field is presented at the top of the display. The values displayed in the other common contact data fields are similarly ordered for display based on the differentiating factors of the distinct values occurring in the common contact data fields.

The user may then select entries in the display. For example, the user may click on the title of a common contact data field (e.g., "Name) to find out more information about the field. The user may also click on "Louis Smith" to find out more information about Louis Smith. Information regarding these user selections is then sent to the dynamic contact application (508) for use in determining user preferences.

Figure 6:
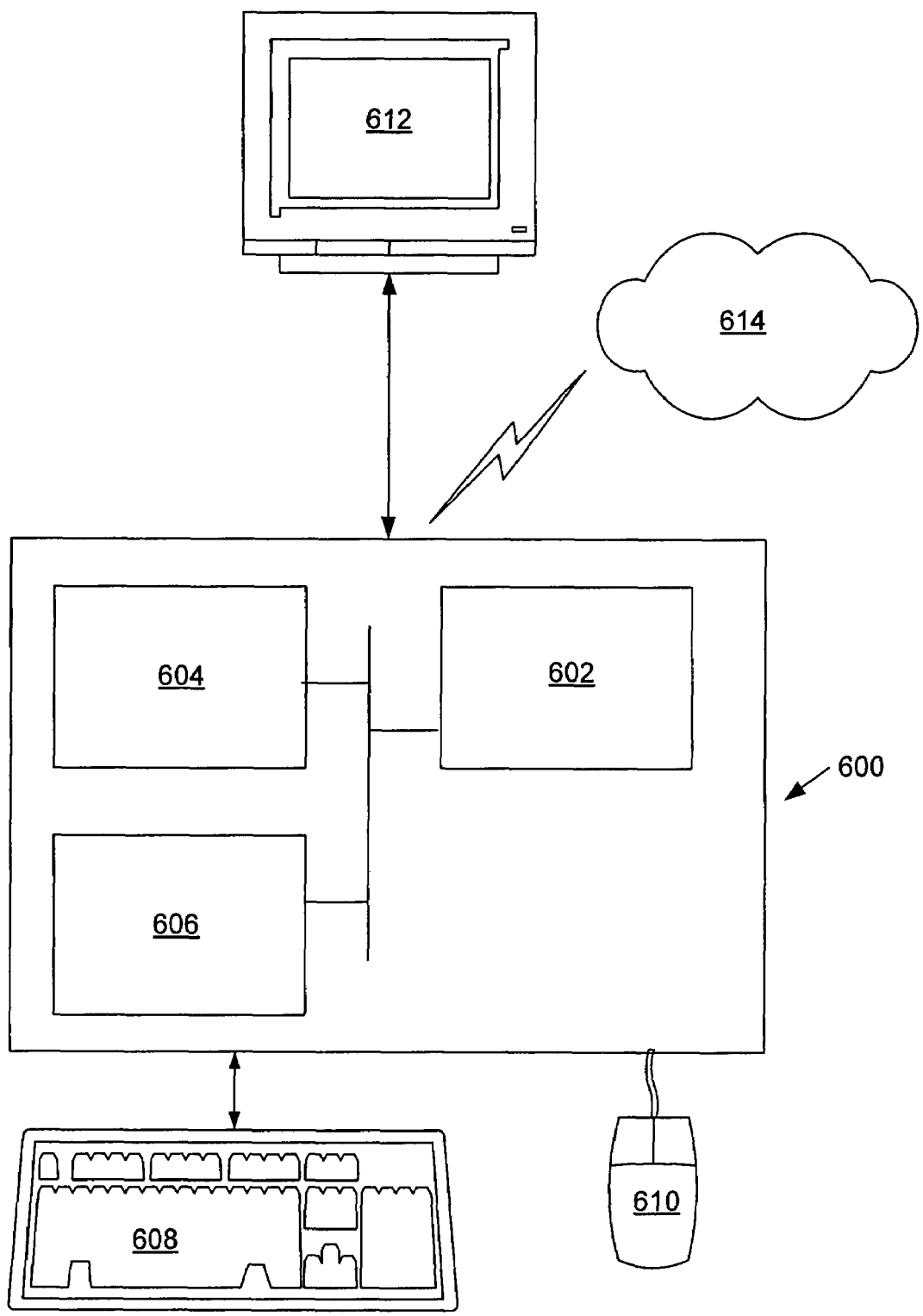
FIG. 6 shows a computer system in accordance with one or more embodiments of the invention.

Embodiments of the invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a network (614) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, embodiments of the invention may be implemented on a distributed system having a plurality of nodes, where each portion of the invention (e.g., the contact repository, the dynamic contact manager, and the client interface) may be located on a different node within the distributed system. In some embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for presenting contact information, comprising:
    receiving a search request for the contact information;
    retrieving, in response to the search request, a result set comprising a plurality of contacts, wherein the plurality of contacts comprises a first set of values corresponding to a first common contact data field and a second set of values corresponding to a second common contact data field;
    identifying, using a processor, a plurality of distinct values from the first set of values;
    calculating, using the processor, a plurality of differentiating factors for the plurality of distinct values by determining a number of occurrences of each of the plurality of distinct values in the first set of values; and
    selectively displaying the plurality of distinct values and a portion of the second set of values based on the plurality of differentiating factors.

2. The method of claim 1, wherein the result set is retrieved from a plurality of contact data repositories.

3. The method of claim 1, further comprising:
    altering a priority of at least one selected from a group consisting of the first common contact data field and the second common contact data field.

4. The method of claim 3, wherein altering the priority is responsive to a client's behavior in a previous search request.

5. The method of claim 1, wherein the second common contact data field is selected from a group consisting of a default common contact data field and a previously selected common contact data field.

6. The method of claim 1, wherein at least one of the second set of values is received in a markup language.

7. The method of claim 1, further comprising assigning a weight to at least one of the plurality of distinct values for use in calculating the plurality of differentiating factors.

8. The method of claim 1, further comprising assigning a plurality of priorities to the first common contact data field and the second common contact data field, wherein selectively displaying the plurality of distinct values and the portion of the second set of values is further based on the plurality of priorities.

9. A method for presenting contact information, comprising:
    generating a search request for the contact information; and
    accessing the contact information retrieved in response to the search request, wherein the contact information is selectively displayed by:
        selecting contact information from a result set having a plurality of contacts, wherein the plurality of contacts comprises a first set of values corresponding to a first common contact data field and a second set of values corresponding to a second common contact data;
        identifying, using a processor, a plurality of distinct values from the first set of values;
        calculating, using the processor, a plurality of differentiating factors for the plurality of distinct values by determining a number of occurrences of each of the plurality of distinct values in the first set of values; and
    selectively displaying, based on the plurality of differentiating factors, the plurality of distinct values and a portion of the second set of values.

10. The method of claim 9, further comprising:
    altering a priority of at least one selected from a group consisting of the first common contact data field and the second common contact data field.

11. The method of claim 10, wherein altering the priority is responsive to a client's behavior in a previous search request.

12. The method of claim 9, wherein the second common contact data field is selected from a group consisting of a default common contact data field and a previously selected common contact data field.

13. The method of claim 9, wherein at least one of the second set of values is received in a markup language.

14. The method of claim 9, wherein the contact information is further selectively displayed by assigning a weight to at least one of the plurality of distinct values for use in calculating the plurality of differentiating factors.

15. A system for presenting contact information, comprising:
    a processor;
    a first contact data repository; and a dynamic contact application executing on the processor, in communication with the first contact data repository, wherein the dynamic contact application is configured to:

receive a search request for the contact information;

retrieve, in response to the search request, a result set comprising a plurality of contacts, wherein the plurality of contacts comprises a first set of values corresponding to a first common contact data field and a second set of values corresponding to a second common contact data field;

identify a plurality of distinct values from the first set of values;

calculate a plurality of differentiating factors for the plurality of distinct values by determining a number of occurrences of each of the plurality of distinct values in the first set of values; and selectively display, based on the plurality of differentiating factors, the plurality of distinct values and a portion of the second set of values.

16. The system of claim 15, further comprising:

a second contact data repository, wherein the dynamic contact application is further configured to retrieve the result set from the first contact data repository and the second contact data repository.

17. The system of claim 15, wherein at least one of the second set of values is received in a markup language.

18. The system of claim 15, wherein of the second common contact data field is selected from a group consisting of a default common contact data field and a previously selected common contact data field.

19. The system of claim 15, wherein the dynamic contact application is further configured to assign a weight to at least one of the plurality of distinct values for use in calculating the plurality of differentiating factors.

20. The system of claim 15, wherein the dynamic contact application is further configured to assign a plurality of priorities to the first common contact data field and the second common contact data field, wherein selectively displaying the plurality of distinct values and the portion of the second set of values is further based on the plurality of priorities.

21. A computer readable medium having stored therein thereon computer-readable instructions, which when executed by a computer processor, cause the computer processor to:

receive a search request for the contact information;

retrieve, in response to the search request, a result set comprising a plurality of contacts, wherein the plurality of contacts comprises a first set of values corresponding to a first common contact data field and a second set of values corresponding to a second common contact data field;

identify a plurality of distinct values from the first set of values;

calculate a plurality of differentiating factors for the plurality of distinct values by determining a number of occurrences of each of the plurality of distinct values in the first set of values; and selectively display, based on the plurality of differentiating factors, the plurality of distinct values and a portion of the second set of values.

22. The computer readable medium of claim 21, wherein the result set is retrieved from a plurality of contact data repositories.

23. The computer readable medium of claim 21, the instructions further causing the computer processor to alter a priority of at least one selected from a group consisting of the first common contact data field and the second common contact data field.

24. The computer readable medium of claim 23, wherein the priority is altered responsive to a client's behavior in a previous search request.

25. The computer readable medium of claim 21, wherein the second common contact data field is selected from a group consisting of a default common contact data field and a previously selected common contact data field.

26. The computer readable medium of claim 21, wherein at least one of the second set of values is received in a markup language.

27. The computer readable medium of claim 21, the instructions further causing the computer processor to assign a weight to at least one of the plurality of distinct values for use in calculating the plurality of differentiating factors.

28. The computer readable medium of claim 21, the instructions further causing the computer processor to assign a plurality of priorities to the first common contact data field and the second common contact data field, wherein selectively displaying the plurality of distinct values and the portion of the second set of values is further based on the plurality of priorities.

* * * * *